United States Patent
Iyer et al.

(10) Patent No.: US 7,711,372 B2
(45) Date of Patent: May 4, 2010

(54) METHOD AND SYSTEM FOR RADIO-INDEPENDENT PREDICTIVE HANDOFFS IN A WIRELESS NETWORK

(75) Inventors: Jayaraman R. Iyer, Sunnyvale, CA (US); Anand K. Oswal, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1391 days.

(21) Appl. No.: 11/128,730

(22) Filed: May 13, 2005

(65) Prior Publication Data

US 2006/0258361 A1     Nov. 16, 2006

(51) Int. Cl.
    *H04W 40/00*     (2006.01)
(52) U.S. Cl. .................. 455/447; 455/436; 455/437
(58) Field of Classification Search ............... 455/447, 455/436, 437, 438, 439, 442, 452.2, 453
    See application file for complete search history.

(56) References Cited

U.S. PATENT DOCUMENTS

| | | | |
|---|---|---|---|
| 5,594,943 A | 1/1997 | Balachandran | 455/33.2 |
| 5,673,307 A | 9/1997 | Holland et al. | 379/60 |
| 5,873,036 A | 2/1999 | Vucetic | 455/439 |
| 5,910,947 A * | 6/1999 | Futamura | 370/332 |
| 6,128,493 A | 10/2000 | Song | 455/436 |
| 6,438,377 B1 * | 8/2002 | Savolainen | 455/439 |
| 6,449,305 B1 | 9/2002 | Menich et al. | 375/141 |
| 6,701,150 B1 * | 3/2004 | Huang et al. | 455/439 |
| 6,771,956 B1 | 8/2004 | Beeler | 455/423 |
| 6,795,699 B1 | 9/2004 | McCraw et al. | 455/408 |
| 6,871,071 B2 * | 3/2005 | Takao et al. | 455/436 |
| 7,099,681 B2 * | 8/2006 | O'Neill | 455/512 |
| 2003/0100306 A1 | 5/2003 | Shinoda | 455/435 |
| 2004/0009749 A1 | 1/2004 | Arazi et al. | 455/41.2 |

* cited by examiner

*Primary Examiner*—Melur Ramakrishnaiah
(74) *Attorney, Agent, or Firm*—Baker Botts L.L.P.

(57) ABSTRACT

According to one embodiment of the invention, a method includes determining, at a base station, at least one usability factor providing a relative measure of the desirability of receiving control of a mobile unit. The method also includes communicating, from a base station to a remote controller, the determined at least one usability factor for comparison to at least one usability factor of another base station as determined at the other base station and communicated to the remote controller. The method also includes taking control, by the base station, of the mobile unit in response to receiving a signal from a controller to take control of the mobile unit in response to comparison of the controller of the at least one usability factor determined by the base station and the at least one usability factor determined by the other base station.

40 Claims, 3 Drawing Sheets

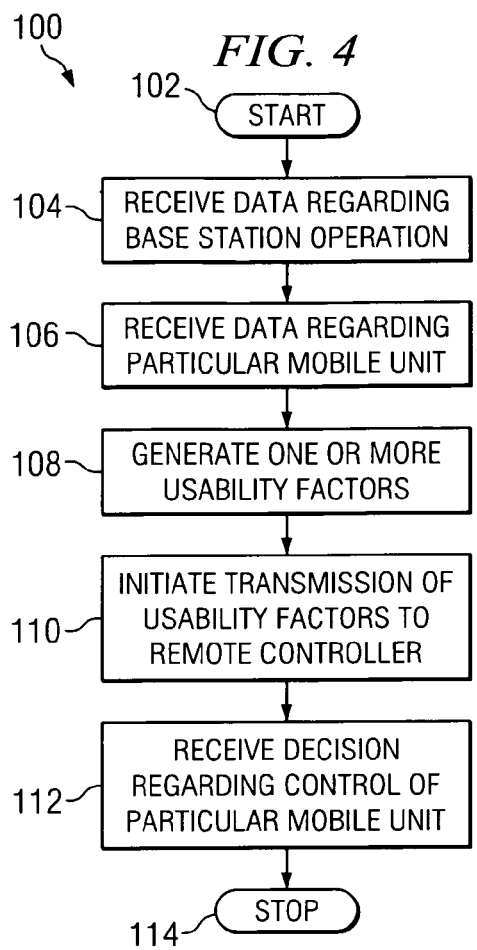
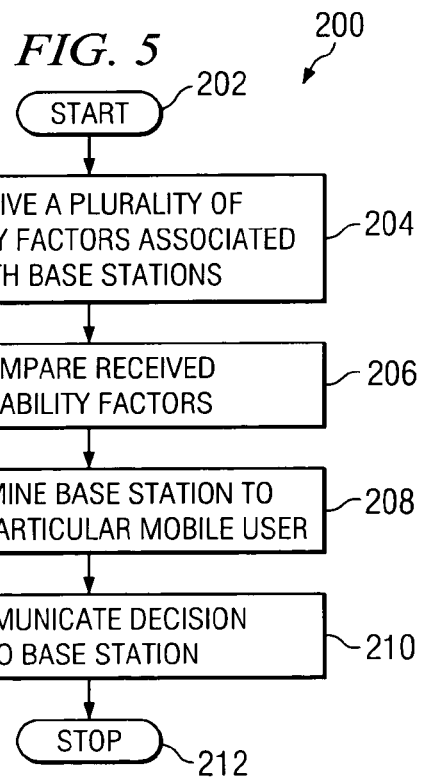

METHOD AND SYSTEM FOR RADIO-INDEPENDENT PREDICTIVE HANDOFFS IN A WIRELESS NETWORK

TECHNICAL FIELD OF THE INVENTION

This invention relates generally to wireless networks and more particularly to a method and system for radio-independent predictive handoffs in a wireless network.

BACKGROUND OF THE INVENTION

Wireless networks are pervasive in today's society. Wireless networks provide the capability of a mobile unit, such as a cell phone or a laptop, to maintain communication while moving through a geographic region, and thus have become commonplace and important.

Wireless networks generally include a plurality of base stations. Each base station communicates wirelessly with mobile units within a defined geographic area. The communications may then be transferred over a wired line to a wired network, enabling communications with parties outside the wireless network. As mobile units progress through the base station's defined geographic area, sometimes referred to as a cell, a decision needs to be made regarding to which base station responsibility for the mobile unit will shift as the mobile unit leaves the defined geographic area for the present base station.

SUMMARY

According to one embodiment of the invention, a method includes determining, at a base station, at least one usability factor providing a relative measure of the desirability of receiving control of a mobile unit. The method also includes communicating, from a base station to a remote controller, the determined at least one usability factor for comparison to at least one usability factor of another base station as determined at the other base station and communicated to the remote controller. The method also includes taking control, by the base station, of the mobile unit in response to receiving a signal from a controller to take control of the mobile unit in response to comparison of the controller of the at least one usability factor determined by the base station and the at least one usability factor determined by the other base station.

Embodiments of the invention may provide numerous technical advantages. Some, none, or all embodiments of the invention may include the below-listed advantages. According to one embodiment, a predictive handoff may be determined based upon generic usability factors, allowing greater interchangeability of centralized decision makers. Further, in some embodiments, centralized predictive handoff decisions may be made by a router/gateway because of the use of standard usability factors determined at the base station rather than at a centralized controller because special intelligence is not required at the centralized controller.

Other advantages will be readily apparent to one of skill in the art.

BRIEF DESCRIPTION OF THE FIGURES

For a more complete understanding of the present invention and its advantages, references now made to the following description, taken in conjunction with the accompanying drawings, in which:

FIG. 4 is a flowchart illustrating example steps associated with a method for generating one or more usability factors via the control entity of FIG. 2B; and FIG. 5 is a flowchart illustrating a method for determining to which base station responsibility for a mobile unit should shift based on a comparison of a plurality of usability factors for a plurality of base stations.

DETAILED DESCRIPTION OF EXAMPLE EMBODIMENTS

Embodiments of the present invention and its advantages are best understood by referring to FIGS. 1A through 5 of the drawings, like numerals being used for like and corresponding parts of the various drawings.

Figure 1A:
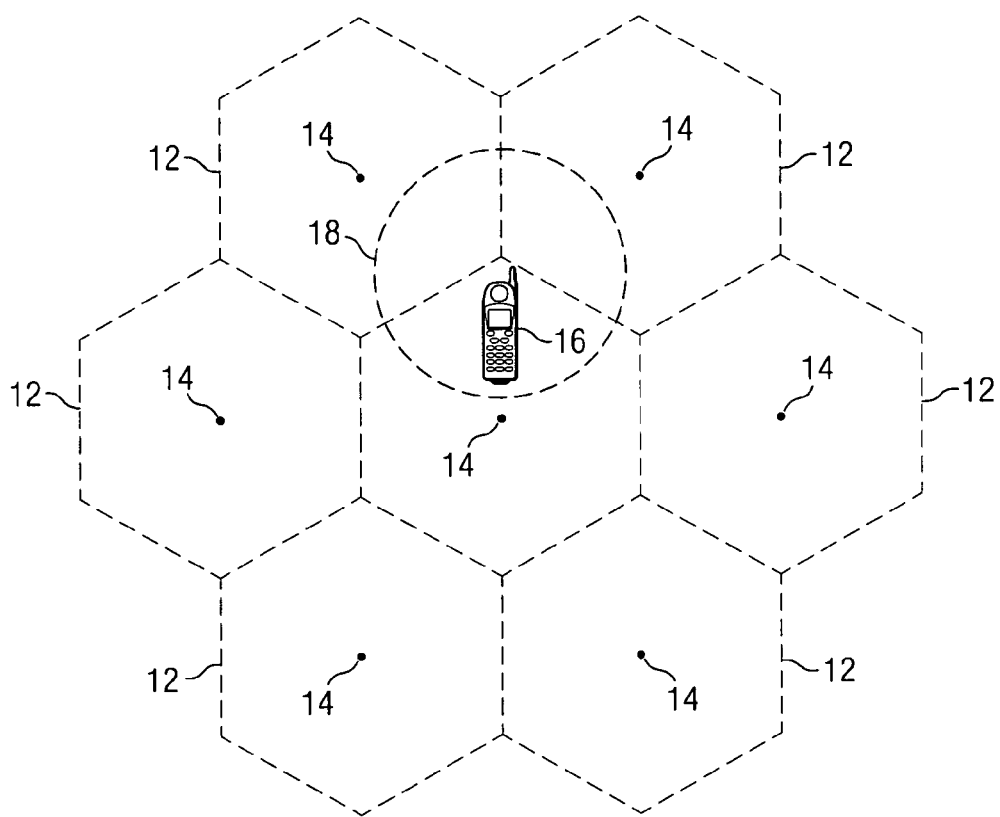
FIG. 1A is a schematic diagram illustrating a plurality of cells in a wireless network.

FIG. 1A is a schematic diagram illustrating a wireless network 10 that may benefit from the teachings of the present invention. As illustrated, wireless network 10 comprises a plurality of geographic regions 12, sometimes referred to as cells. Each geographic region 12 has an associated base station 14. Each base station 14 is responsible for controlling communications generally within its associated geographic region 12. For example, as a mobile unit 16, such as a cell phone, moves through a geographic region 12 associated with a particular base station 14, the base station 14 may communicate wirelessly with mobile unit 16. This wireless communication may be performed according to techniques well known in the art. Base station 14 in turn may communicate through a landline with other networks, thus allowing communications between mobile unit 16 and other parties, such as a user of a conventional telephone.

As described above, as a mobile user 16 begins to depart from any given geographical region 12, a decision needs to be made regarding which new base station will take over control of communications with mobile unit 16. The determination of which base station will assume responsibility for a given mobile station 16 beforehand, i.e., before the mobile unit actually moves, is often referred to as a predictive handoff. As illustrated in FIG. 1A, there will generally be a region 18 where a plurality of base stations could reasonably maintain control over a particular mobile unit 16. Thus, it is not simply a matter of determining in which geographic region a particular mobile unit resides that controls the determination of which mobile station 16 will assume control of communicating with mobile unit 16.

Figure 1B:
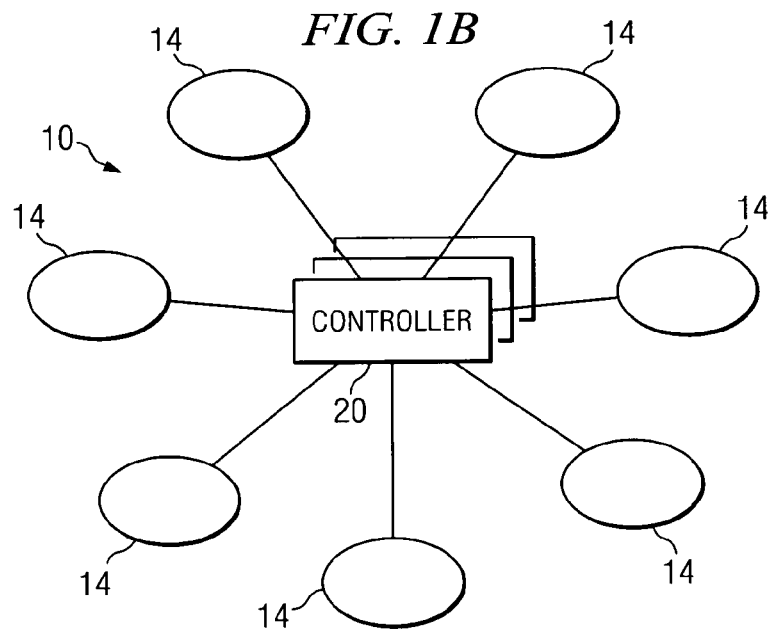
FIG. 1B is a block diagram illustrating a plurality of base stations and an associated controller in the wireless network of FIG. 1A.

FIG. 1B is a block diagram illustrating additional details of network 10. As illustrated, each of the plurality of base stations is coupled to a controller 20. Also as illustrated, controller 20 may be coupled to a plurality of other controllers associated with respective base stations. Controller 20 may be located at a geographic location remote from each of the base stations 14, or may be located in any other suitable location.

Referring now to FIGS. 1A and 1B, conventionally, in making a decision regarding which base station will assume responsibility for a particular mobile unit 16, controller 20 receives raw data from a plurality of candidate base stations 14. This raw data is radio-independent raw data, meaning that it is data specific to a particular wireless implementation.

Example data transmitted from base stations 14 to controller 20 include radio signal strength, physical level strength, additional physical parameters, and noise level. Based upon this raw data, a conventional controller would make a determination as to which base station 14 should assume responsibility for any given mobile unit 16.

One problem associated with controller 20 making such a decision based upon this conventionally-provided radio-independent data is that it often becomes a complicated decision involving several factors, which hinders interoperability between controllers associated with different networks. Thus, controller 20 is specific to the base stations to which it is associated and cannot easily be replaced and/or communicate with other controllers 20 in performing these predictive handoffs. Further, the binding relationship between the controller and the base stations results in the same entity having to provide both the base station and the controller.

The teachings of the invention recognize that instead of communicating raw data to a centralized controller that may be used for predictive handoffs, that the base stations 14 may analyze necessary data and generate a normalized factor, referred to here as a usability factor or load factor, that is indicative of the desirability of that particular base station assuming control of a particular mobile station 16. In this manner, the centralized controllers, such as centralized controller 20, would merely need to compare two numbers (or, as described in greater detail below, multiple sets of two numbers) in order to determine to which base station responsibility should be given, rather than invoking algorithms specific to any particular radio implementation associated with the wireless network.

As described in greater detail below, two examples of the usability factor are a load of a particular base station and the cost, in terms of resources required for a particular base station, to assume responsibility for a given mobile unit. This contrasts with conventional techniques in which raw Layer 1 or Layer 2 parameters from which the load of the base station could be determined. In contrast to conventional techniques where the load level is not determined locally, the load level is determined locally at the base station and provided as a usability factor to the centralized controller. In addition, the cost factor is determined locally according to the teachings of the invention which contrast with prior techniques that do not determine a cost locally. A load, or load factor, may be an indication of the percentage of the total load capacity of a base station that is currently used, or the additional number of mobile units that can be supported, or the total number of units that can be supported. Additional details are described in greater detail below in conjunction with FIGS. 2A through 5.

Figure 2A:
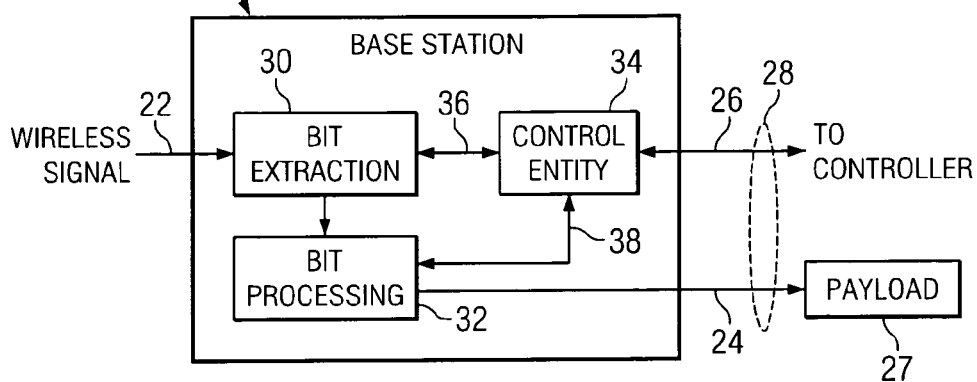
FIG. 2A is a block diagram illustrating additional details of the base stations of FIGS. 1A and 1B.

FIG. 2 is a block diagram illustrating additional details of one example of base station 14 according to the teachings of the invention. As illustrated, in this example base station 14 receives a wireless signal 22 and generates a payload 24 and a usability factor 26. Both payload 24 and usability factor 26 may be communicated over a common link, such as wireline 28. In the example of FIG. 2A, base station 34 is associated with an IP network. Thus the wireless signal is converted into a format appropriate for IP communication; however, the teachings of the invention are also applicable to base stations associated with traditional telephone networks.

In this example, wireless signal 22 is received by bit extraction unit 30. Bit extraction unit 30 extracts the bits from the wireless signal and passes though to bit processing unit 32. Bit processing unit 32 performs additional functions to interpret the bits and generate payload 27 in a suitable format for communication over link 28. It will be understood that this implementation of FIG. 2A is merely one example and other suitable data processing techniques may be utilized. For example, instead of processing the bits within base station 34 the extracted bits could be merely transmitted over link 28 and later analyzed.

Also contained within base station 14 is a control entity 34. Control entity 34 communicates with both bit extraction 30, bit processing 32, and other components of base station (not explicitly shown), to acquire data associated with base station 14. This data may include the number of mobile users currently being supported by base station 14, the spectrum available to base station 14, the quality of service required by base station 14, the CPU load at the base station 14, the spare capacity available, etc. Based upon the acquired data, control entity 34 generates one or more usability factors to provide to controller 20, as indicated by reference numeral 26. In one example, a usability factor is the number of mobile units a base station can handle. This usability factor may mean the number of additional mobile units a base station can handle. It may also specify the total number of mobile units a base station can handle. As an alternative the generic factor, such as on a scale of 1 to 100, may be utilized that takes into account relevant parameters but is generally indicative the desirability of a particular base station handling a particular mobile unit. Additional details of the operation of control entity 34 are described in greater detail below in conjunction with FIG. 2B and FIG. 4.

Figure 2B:
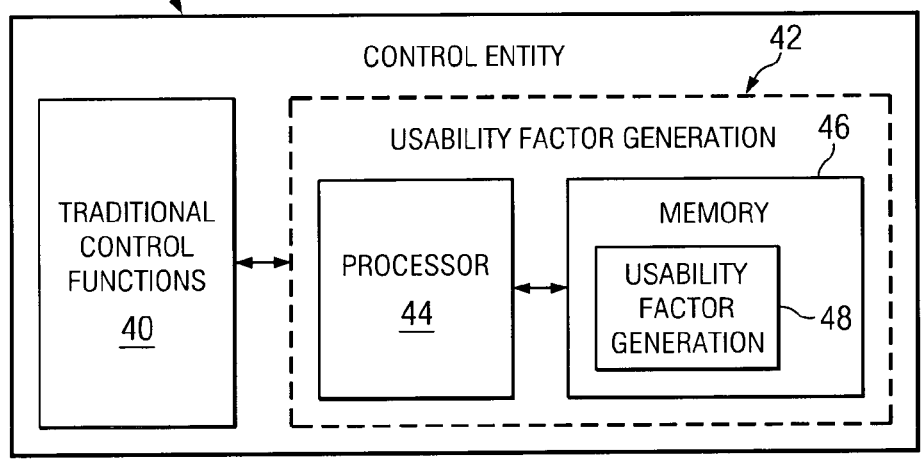
FIG. 2B is a block diagram illustration additional details of a control entity of the base stations of FIG. 2A.

FIG. 2B is a block diagram illustrating additional details of one example implementation of control entity 34. In this example, control entity 34 includes traditional control functions 40 and a usability factor generation block 42. Traditional control functions 40 may include control functions associated with bit extraction and bit processing as described above, as well as other control functions not associated with generation of a usability factor. Usability factor generation block 42 may include in this example a processor 44 and an associated memory 46. Associated memory 46 may include software that includes usability factor generation software 48 that is executable on processor 44. Although a particular implementation is described in this example, it will be understood that other suitable implementations may be utilized, including firmware.

In this example, usability factor generation software 48 performs the necessary functions to generate a usability factor based upon the received data. Example steps associated with this usability factor generation are described in greater detail below in conjunction with FIG. 4. In one embodiment, rather than simply calculating one usability factor, a plurality of usability factors are generated each corresponding to a particular quality of service level. These various usability factors may be transmitted to controller 20 and controller 20 may select the appropriate base station based upon the quality of service desired for the particular mobile user. In another example, in addition to the load of the base station, a cost associated with a particular base station handling a particular mobile user is also utilized in conjunction with the load. A load, or load factor, may be an indication of the percentage of the total load capacity of a base station that is currently used, or the additional number of mobile units that can be supported, or the total number of units that can be supported.

Figure 3:
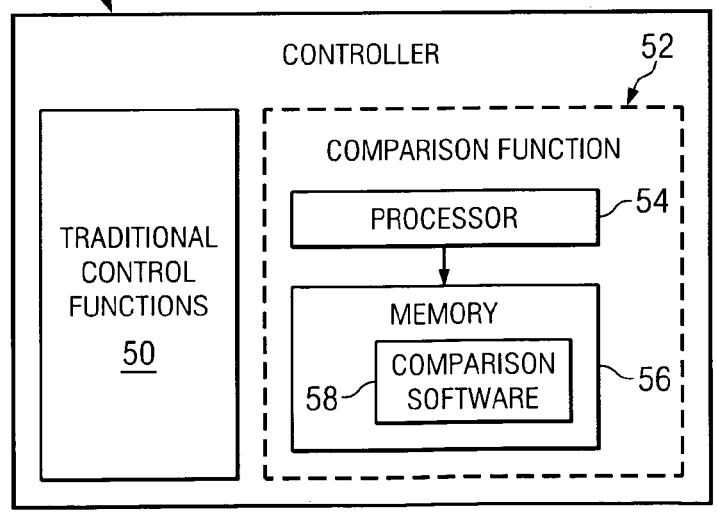
FIG. 3 is a block diagram illustration additional detail of the controller of FIG. 1B.

FIG. 3 is a block diagram illustrating additional details of one example of controller 20 according to the teachings of the invention. In this example, controller 20 includes a traditional control function block 50 and a comparison function block 52. Traditional control function block 50 refers to control functions performed by controller 20 other than the predictive handoff described above. Such functions may include traditional router and gateway functions like routing, authorization, authentication, security, user provisioning, QoS, etc. Although the invention has been described in the context of modifications to traditional controllers, it will be understood that a controller 20 may take any suitable form, and in one embodiment may take the form of an Internet protocol router.

Comparison function 52 includes, in this example, a processor 54 and associated memory 56 storing comparison software 58. Comparison software 58 may be executed on processor 54. Comparison software 58 generally receives one or more usability factors associated with relevant base stations from which a responsible base station will be selected for a particular mobile user and determines based upon the one or more usability factors which base station will assume responsibility. Details associated with this determination are described in greater detail below in conjunction with FIG. 5. Although a particular implementation has been described, it will be understood that other suitable implementations may be utilized for controller 20 in comparison function 52, including those implemented in firmware.

FIG. 4 is a block diagram illustrating example details associated with a method 100 for generating one or more usability factors for predictive handoffs according to the teachings of the invention. In this example, method 100 is performed by usability factor generation software 48 of control entity 34; however, it will be understood that method 100 may be performed by other suitable devices. The method begins at step 102. At step 104 usability factor generation software 48 receives data regarding the base station operation. Examples of such data include radio resource measurements, cumulative signal to noise ratio, etc. At step 106 data is received regarding a particular mobile unit for which handoff is to be predicted. Such data may include a list of target base stations 14 and the signal to noise ratio associated with each of them. Based upon the data received at steps 104 and 106, one or more usability factors are generated at step 108.

As described above, the usability factors may be those described above or may be other types of usability factors using other algorithms but that generally provide an indication of the desirability of a particular base station assuming control of a particular mobile unit. In one example, the base station 14 knows its spectrum and the quality of the spectrum at a given point. Based upon this data, the base station can calculate how many users it can support on the spectrum, which gives the base station an indication of what instantaneous number of users it can support. A consideration that may also be used in determining a usability factor is the average throughput of the geographic region 12 associated with the particular base station.

At step 110 transmission of the calculated usability factor or factors is initiated. In response to comparison of the transmitted usability factor by controller 20 to other received usability factors, a decision is received regarding control of the particular mobile unit at step 112. The method concludes at step 114.

It should be noted that this process may be repeated for any particular mobile unit, and the data received at steps 104 and 106 may be updated in response to their assuming control or not assuming control of a particular mobile unit. Thus, the teachings of the invention result in a predictive model that converges, meaning that responsibility is not repeatedly bounced back and forth between two base stations.

FIG. 5 is a flowchart illustrating example details associated with a method 200 of comparing received usability factors. Although this method is described in the context of controller 20 performing this function, it will be understood that other suitable devices may perform this method. The method begins at step 202. At step 204 one or more usability factors are received from each of a plurality of base stations that are candidate base stations for receiving control of a particular mobile device. As described above, these usability factors are simply normalized numerical numbers that can easily be compared, and do not require specified algorithms to generate an idea of desirability of any particular base station assuming control of a mobile unit.

At step 206 the one or more usability factors are compared and at step 208 a determination to which base station a particular mobile unit should be assigned responsibility is made based upon the comparison. At step 210 the decision is communicated to the associated base stations, allowing the selected base station to obtain control and the other base stations to know that they will not obtain control of the particular mobile station 16. The method concludes at step 212.

Thus, a method and system are provided for handling predictive handoffs in a wireless network that provides for easy interoperability between controllers and base stations throughout the network. Further, in some embodiments, centralized predictive handoff devices may be made by a router because of the use of standard usability factors determined at the base station rather than at a centralized controller because special intelligence is not required at the centralized controller.

In a particular embodiment, at least one usability factor for a first base station is determined according to different criteria from the at least one usability factor for a second base station. In a particular embodiment, a usability factor may be determined based on an average speed of access by a user.

Although the present invention has been described with several embodiments, a myriad of changes, variations, alterations, transformations, and modifications may be suggested to one skilled in the art, and it is intended that the present invention encompass such changes, variations, alterations, transformations, and modifications as they fall within the scope of the appended claims.

What is claimed is:

1. A method for call handoff in a wireless network comprising a controller and a plurality of base stations including first and second base stations, the method comprising:
   determining at the first and second base stations at least one respective usability factor, each respective usability factor providing a relative measure of the desirability of receiving control of a mobile unit;
   communicating each of the at least one usability factors from each of the first and second base stations to the controller without communicating raw signal strengths from the first and second base stations to the controller, the controller located remote from the first and second base stations; and
   selecting one of the first and second base stations to receive control of the mobile unit by comparing, by the controller, the at least one usability factor for the first base station to the at least one usability factor for the second base station without comparing radio signal strengths of the first and second base stations.

2. The method of claim 1, wherein the at least one usability factor includes a load of the respective base station.

3. The method of claim 1, wherein the at least one usability factor includes a cost associated with a respective base station receiving control of the mobile unit.

4. The method of claim 1, wherein the at least one usability factor includes a load of the respective base station and a cost associated with the respective base station receiving control of the mobile unit.

5. The method of claim 1, wherein the at least one usability factor includes a load of the respective base station for each respective one of a plurality of Quality of Service levels for the respective base station.

6. The method of claim 1, wherein the at least one usability factor includes the total number of mobile units a respective base station can accommodate.

7. The method of claim 1, wherein the at least one usability factor includes the number of additional mobile units a respective base station can accommodate.

8. The method of claim 1, wherein the at least one respective usability factor for the first base station is determined according to the same criteria as the at least one respective usability factor for the second base station.

9. The method of claim 1, wherein the at least one respective usability factor for the first base station is determined according to different criteria from the at least one respective usability factor for the second base station.

10. The method of claim 1, wherein the respective usability factor is determined based on an associated spectrum, quality of the associated spectrum, and an average speed of access by a user.

11. The method of claim 10, wherein the usability factor is further indicative of the instantaneous number of users that can be supported by the respective base station.

12. An apparatus comprising:
a wireless network base station, the base station operable to receive a wireless call and transmit at least portions of the call to a wired line, the base station further comprising logic encoded in a computer-readable medium that when executed on a processor is operable to:
determine at least one usability factor providing a relative measure of the desirability of receiving control of a mobile unit;
communicate the at least one usability factor to a remote controller for comparison to at least one usability factor of another base station that is determined at the other base station and communicated to the remote controller, the communication performed without communicating raw signal strengths from the base station to the controller; and
receive a signal from the controller to take control of the mobile unit in response to comparison by the controller of the at least one usability factor determined by the base station and at least one usability factor to be determined by the other base station, the comparison performed without comparing radio signal strengths of the base station and the other base station.

13. The apparatus of claim 12, wherein the at least one usability factor includes a load of the respective base station.

14. The apparatus of claim 12, wherein the at least one usability factor includes a cost associated with a respective base station receiving control of the mobile unit.

15. The apparatus of claim 12, wherein the at least one usability factor includes a load of the respective base station and a cost associated with the respective base station receiving control of the mobile unit.

16. The apparatus of claim 12, wherein the at least one usability factor includes a load of the respective base station for each respective one of a plurality of Quality of Service levels for the respective base station.

17. The apparatus of claim 12, wherein the at least one usability factor includes the total number of mobile units a respective base station can accommodate.

18. The apparatus of claim 12, wherein the at least one usability factor includes the number of additional mobile units a respective base station can accommodate.

19. The apparatus of claim 12, wherein the at least one respective usability factor for the first base station is determined according to the same criteria as the at least one respective usability factor for the second base station.

20. The apparatus of claim 12, wherein the at least one respective usability factor for the first base station is determined according to different criteria from the at least one respective usability factor for the second base station.

21. The apparatus of claim 12, wherein the respective usability factor is determined based on an associated spectrum, quality of the associated spectrum, and the average user throughput.

22. The apparatus of claim 21, wherein the usability factor is further indicative of the instantaneous number of users that can be supported by the respective base station.

23. A method implemented by a base station in a wireless network comprising:
determining, at the base station, at least one usability factor providing a relative measure of the desirability of receiving control of a mobile unit;
communicating, from the base station to a remote controller, the determined at least one usability factor for comparison to at least one usability factor of another base station that is determined at the other base station and communicated to the remote controller, the communication performed without communicating raw signal strengths from the base station to the controller; and
taking control, by the base station, of the mobile unit in response to receiving a signal from the controller to take control of the mobile unit in response to comparison by the controller of the at least one usability factor determined by the base station and the at least one usability factor determined by the other base station, the comparison performed without comparing radio signal strengths of the base station and the other base station.

24. The method of claim 23, wherein the at least one usability factor includes a load of the base station.

25. The method of claim 23, wherein the at least one usability factor includes a cost associated with the base station receiving control of the mobile unit.

26. The method of claim 23, wherein the at least one usability factor is determined based on an associated spectrum, quality of the associated spectrum, and an average user throughput.

27. An apparatus for use with a wireless network including a plurality of base stations, the apparatus comprising:
a controller operable to:
receive a first at least one usability factor from a first base station and a second at least one usability factor from a second base station, the first and second at least one usability factors each providing a relative measure of the desirability of receiving control of a mobile unit, the first and second base stations having communicated the first at least one usability factor and the second at least one usability factor, respectively, without communicating raw signal strengths from the first and second base stations to the controller;
compare the first at least one usability factor to the second at least one usability factor without comparing radio signal strengths of the first and second base stations; and
select the first or second base station to take control of the mobile unit based on the comparison.

28. The apparatus of claim 27, wherein the at least one usability factor includes a load of the respective base station.

29. The apparatus of claim 27, wherein the at least one usability factor includes a cost associated with a respective base station receiving control of the mobile unit.

30. The apparatus of claim 27, wherein the respective usability factor is determined based on an associated spectrum, quality of the associated spectrum, and an average user throughput.

31. The apparatus of claim 27, wherein the apparatus is an IP router.

32. A method implemented by a controller in a wireless network comprising:
    receiving, by the controller, a first at least one usability factor from a first base station and a second at least one usability factor from a second base station, the first and second at least one usability factors each providing a relative measure of the desirability of receiving control of a mobile unit, the first and second base stations having communicated the first at least one usability factor and the second at least one usability factor, respectively, without communicating raw signal strengths from the first and second base stations to the controller;
    comparing, by the controller, the first at least one usability factor to the second at least one usability factor without comparing radio signal strengths of the first and second base stations; and
    selecting, by the controller, the first or second base station to take control of the mobile unit based on the comparison.

33. The method of claim 32, wherein the at least one usability factor includes a load of the respective base station.

34. The method of claim 32, wherein the at least one usability factor includes a cost associated with a respective base station receiving control of the mobile unit.

35. The method of claim 32, wherein the respective usability factor is determined based on an associated spectrum, quality of the associated spectrum, and an average user throughput.

36. The method of claim 32, wherein the controller is an IP router.

37. A wireless network comprising:
    a plurality of base stations, the plurality including first and second base stations;
    at least one controller;
    means for determining at the first and second base stations at least one respective usability factor, each respective usability factor providing a relative measure of the desirability of receiving control of a mobile unit;
    means for communicating each of the at least one usability factors from each of the first and second base stations to the controller without communicating raw signal strengths from the first and second base stations to the controller, the controller located remote from the first and second base stations; and
    means for selecting one of the first and second base stations to receive control of the mobile unit by comparing, by the controller, the at least one usability factor for the first base station to the at least one usability factor for the second base station without comparing radio signal strengths of the first and second base stations.

38. The wireless network of claim 37, wherein the at least one usability factor includes a load of the respective base station.

39. The wireless network of claim 37, wherein the at least one usability factor includes a cost associated with the respective base station receiving control of the mobile unit.

40. The wireless network of claim 37, wherein the at least one usability factor includes a load of the respective base station and a cost associated with the respective base station receiving control of the mobile unit.

* * * * *